United States Patent
Tsuchida (10) Patent No.: US 9,085,244 B2
(45) Date of Patent: Jul. 21, 2015

(54) TABLE FOR VEHICLE

(71) Applicant: TOYOTA BOSHOKU KABUSHIKI KAISHA, Aichi-ken (JP)

(72) Inventor: Hiroshi Tsuchida, Aichi (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/527,016

(22) Filed: Oct. 29, 2014

(65) Prior Publication Data

US 2015/0114270 A1    Apr. 30, 2015

(30) Foreign Application Priority Data

Oct. 30, 2013   (JP) .................. 2013-225090

(51) Int. Cl.
  *A47B 3/00* (2006.01)
  *B60N 3/00* (2006.01)
  *B60N 2/44* (2006.01)

(52) U.S. Cl.
  CPC ............... *B60N 3/001* (2013.01); *B60N 2/442* (2013.01)

(58) Field of Classification Search
  CPC ........ A47B 83/02; B60N 3/002; E05D 11/10; E05D 11/1007; E05D 11/1014; E05D 11/1021; E05D 11/1028; Y10T 16/54; Y10T 16/54024; Y10T 16/5407; Y10T 16/5474; Y10T 26/5478

USPC .............. 297/173, 163; 108/42, 44, 134, 135, 108/152, 160

See application file for complete search history.

(56) References Cited

U.S. PATENT DOCUMENTS

| | | | | |
|---|---|---|---|---|
| 1,580,289 | A * | 4/1926 | Cummings | 108/134 |
| 2,284,003 | A * | 5/1942 | Luppert | 108/81 |
| 2,743,976 | A * | 5/1956 | Gaston | 108/134 |
| 2,943,896 | A * | 7/1960 | Gaston | 108/134 |
| 5,588,697 | A * | 12/1996 | Yoshida et al. | 297/173 |
| 6,343,834 | B1 * | 2/2002 | Wurmlinger | 297/14 |
| 8,267,017 | B1 * | 9/2012 | Michael et al. | 108/42 |

FOREIGN PATENT DOCUMENTS

JP       2009-214798      9/2009

* cited by examiner

*Primary Examiner* — Janet M Wilkens
(74) *Attorney, Agent, or Firm* — Greenblum & Bernstein, P.L.C.

(57) ABSTRACT

A table for a vehicle includes a table main body, and an extending and retracting mechanism which connects the table main body to a base so as to be extended and retracted relative to the base. The mechanism includes link mechanism units which extend and retract the table main body relative to the base by a link movement, an operation part which is connected to the link mechanism units and operates the link mechanism units, and a cancel mechanism unit which prevents the link mechanism units from being operated without through an operation of the operation part. The cancel mechanism unit is configured such that when one of the link mechanism units is operated in a direction without through the operation of the operation part, an operating force is not transmitted to the operation part.

5 Claims, 11 Drawing Sheets

TABLE FOR VEHICLE

CROSS-REFERENCE TO RELATED APPLICATION

This application claims priority from Japanese Patent Application No.2013-225090, filed on Oct. 30, 2013, the entire subject matter of which is incorporated herein by reference.

BACKGROUND OF THE INVENTION

1. Field of the Invention

The present invention relates to a table for a vehicle, and more specifically, to a table provided for a seat passenger on a vehicle seat.

2. Description of the Related Art

There has been known a configuration in which a foldably retractable table is attached to a side of a vehicle seat. The table has a configuration in which an edge of the table at a side adjacent to the seat is rotatably supported, and the table is configured to switch between a horizontally extended state and a downwardly folded state. Specifically, the table has a bending and extending link connected between a bottom part of the table and a base to which the table is folded. The bending and extending link is configured to horizontally hold and support the table and to fold together with the table by bending and extending movement. The bending and extending link is provided in a pair at front and rear positions between the table and the base, and a connecting shaft with the table is configured by one common connecting rod. The connecting rod is coupled integrally with each bending and extending link. When an operating part at a tip side of the connecting rod is rotated in a rotational direction, the connecting rod and each bending and extending link are integrally bent and extended to raise and fold the table (for example, see JP-A-2009-214798).

However, in the above configuration, the rear bending and extending link may be contacted to a foot of a passenger sitting on a rear seat and thus bent. Thereby, the front bending and extending link is also bent together, so that the table may be unintentionally folded.

SUMMARY OF THE INVENTION

Accordingly, it is an aspect of the present invention to suppress or prevent a table for a vehicle from being unintentionally extended and retracted due to an external force.

According to an illustrative embodiment of the present invention, there is provided a table for a vehicle including a table main body, on which an object can be put, and an extending and retracting mechanism configured to connect the table main body to a base such that the table main body can be extended and retracted relative to the base. The extending and retracting mechanism includes a pair of link mechanism units configured to extend and retract the table main body relative to the base by a link movement, an operation part connected to the link mechanism units and configured to operate the link mechanism units, and a cancel mechanism unit configured to prevent the link mechanism units from being operated without through an operation of the operation part. The cancel mechanism unit is configured such that, while the operation part is connected to one of the link mechanism units such that a force can be transmitted in both an extending direction and a retracting direction and is connected to the other of the link mechanism units such that a force can be transmitted only in one direction of the extending direction and the retracting direction and cannot be transmitted in the other direction of the extending direction and the retracting direction, when the other of the link mechanism units is operated in the other direction without through the operation of the operation part, an operating force is not transmitted to the operation part.

According to the above configuration, even when the other of the link mechanism units is operated in the other direction without through the operation of the operation part, the operating force is not transmitted to the operation part. Therefore, even when the external force is applied, since it is possible to keep the posture of the one of the link mechanism units, it is possible to prevent the table from being unintentionally retracted due to the external force.

In the above table, the extending and retracting mechanism may be configured to extend and retract the table main body relative to the base between a horizontally extended state and a vertically retracted state by a rotation, the link mechanism units may be configured to be extended and bent between the table main body and the base such that the link mechanism units are extended to hold the table main body at the extended state and are bent to guide the table main body in a retracting direction, and the cancel mechanism unit may be configured such that a force applied from the operation part in a direction from an extended state to a bent state of the other of the like mechanism units is transmitted and an force in an opposite direction is not transmitted.

According to the above configuration, even when the other of the link mechanism units is contacted with a passenger's foot, for example, and is thus applied with the external force in a bending direction thereof in a state where the table main body is held at the extended state by the support of the link mechanism units, the one of the link mechanism units is still held at the support posture state. Therefore, even when the table is mounted at a low position at which the passenger's foot can be contacted thereto, it is possible to prevent the table from being unintentionally retracted.

Further, in the above table, the cancel mechanism unit may be configured by a contact structure provided between the operation part and the other of the link mechanism units such that the operation part contacts the other of the link mechanism units to become a state capable of transmitting a force in the one direction, and the operation part is separated from the other of the link mechanism units to become a state of not transmitting a force in the other direction.

According to the above configuration, it is possible to simply configure the cancel mechanism unit by the simple contact structure.

DETAILED DESCRIPTION

Hereinafter, an illustrative embodiment of the present invention will be described with reference to the drawings.

Figure 1:
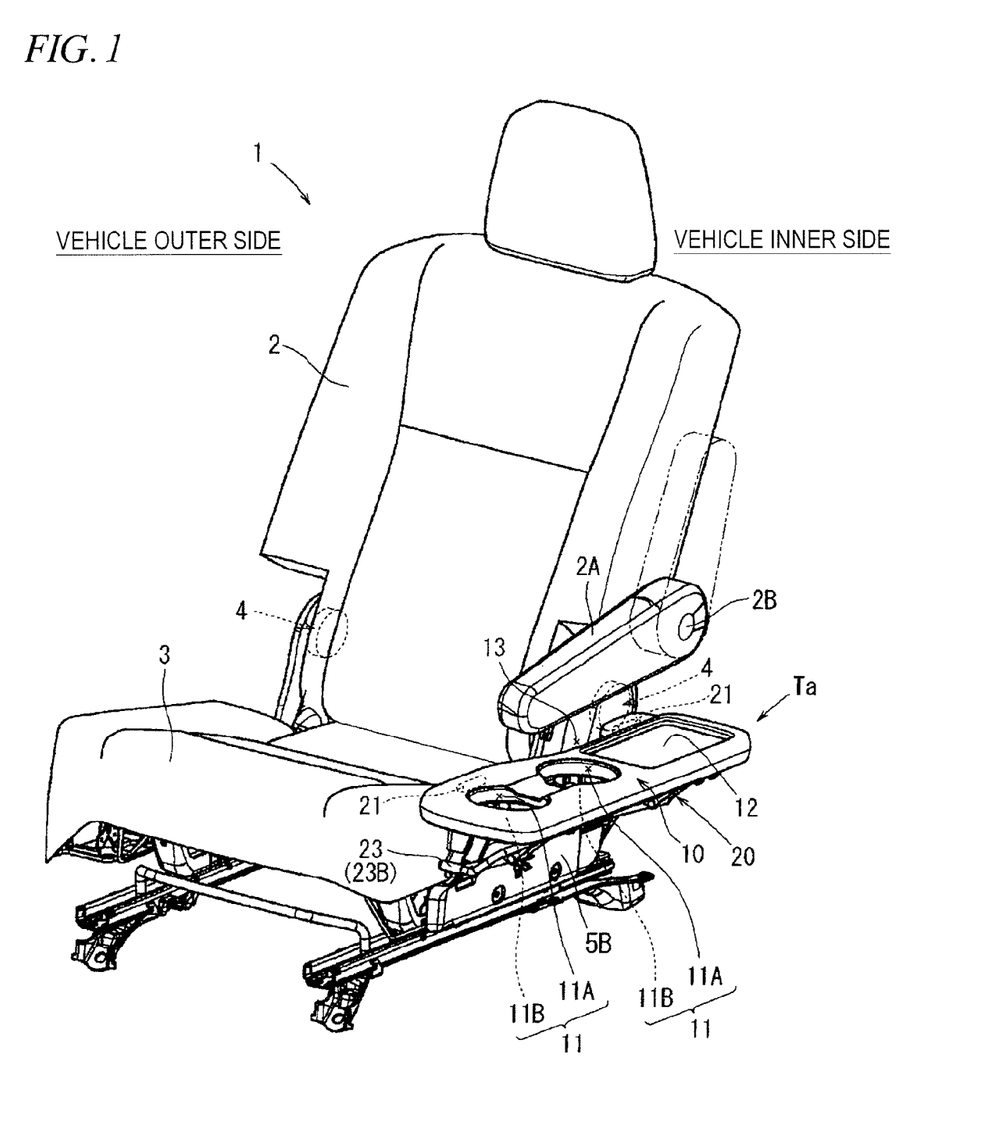
FIG. 1 is a perspective view of a seat to which a table according to an illustrative embodiment is attached.

First, a configuration of a table Ta of an illustrative embodiment is described with reference to FIGS. 1 to 11. In this illustrative embodiment, as shown in FIG. 1, the table Ta is attached to a vehicle inner side of a seat 1 configuring a right seat of an automobile. Here, the seat 1 has a seat back 2 configured as a backrest of a sitting passenger and a seat cushion 3 configured as a sitting part. In the seat back 2, lower end portions of both sides thereof are connected and supported to rear end portions of both sides of the seat cushion 3 through a recliner 4, respectively. Thereby, the seat back 2 is configured such that a backrest angle thereof can be freely adjusted back and forth and can be folded forwards to a position at which the seat back overlaps with an upper surface part of the seat cushion 3 (refer to FIGS. 3 and 4).

Figure 2:
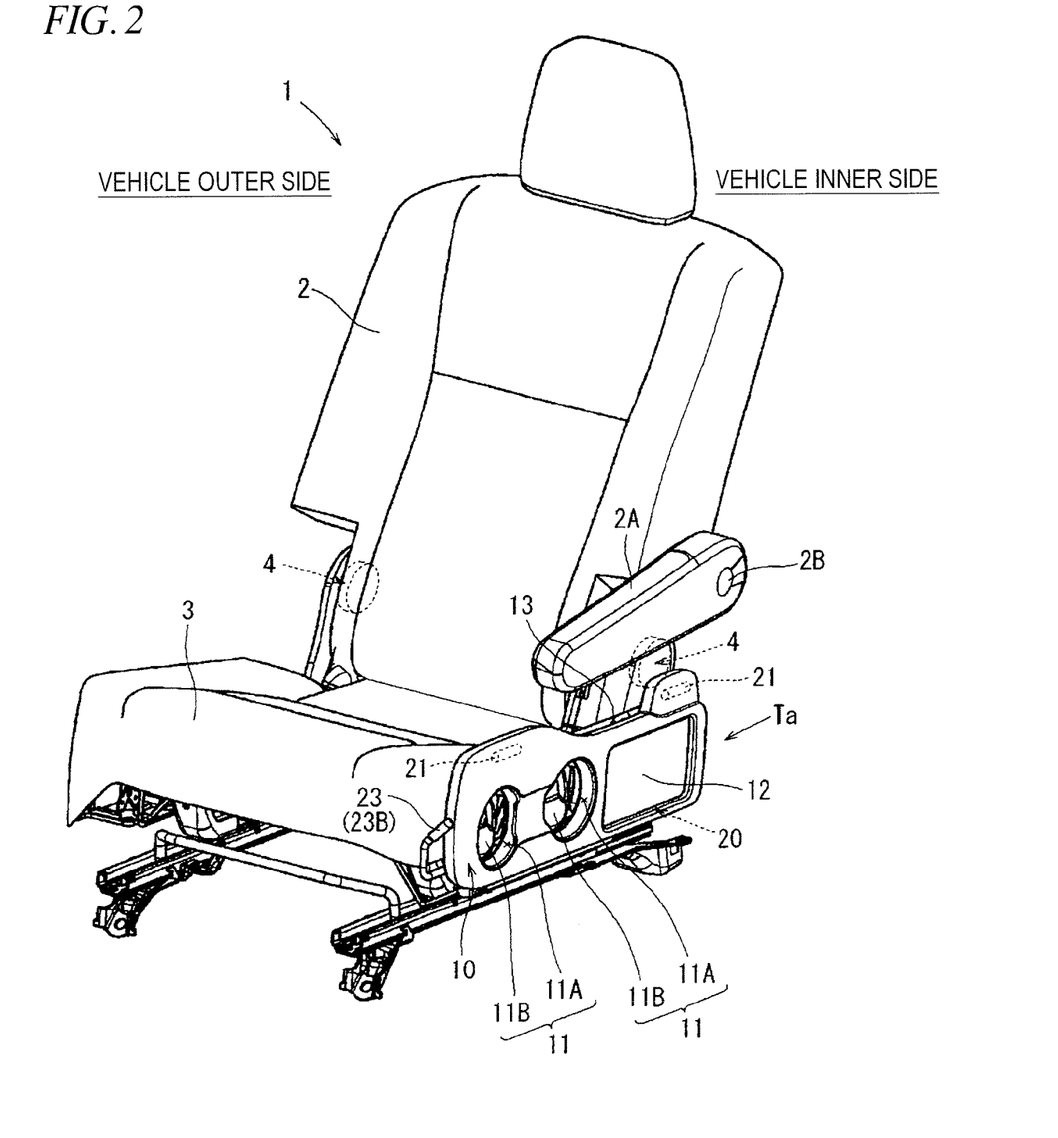
FIG. 2 is a perspective view showing a state where the table is folded.

Also, as shown in FIGS. 1 and 2, an armrest 2A which the sitting passenger uses as an arm support part is attached to the vehicle inner side of the seat back 2. An end portion of a base-side of the armrest 2A is connected to the vehicle inner side of the seat back 2 by a connecting shaft 2B such that the armrest 2A can be tilted. Thereby, the armrest 2A can be switched between a state where the armrest 2A is raised upwardly along a side shape of the seat back 2 and a state where the armrest 2A is folded forwards from the side of the seat back 2 and can be thus used as an arm support part.

The table Ta has a table main body 10 having a flat plate shape and an extending and retracting mechanism 20 capable of switching the table main body 10 between a state where the table main body 10 is horizontally extended (refer to FIG. 1) and a state where the table main body 10 is vertically retracted (refer to FIG. 2). Specifically, the table main body 10 has a flat plate shape which is long in a longitudinal direction of the seat. Further, the table main body 10 has a lightweight flat plate shape of which an inside is hollow by a blow forming of polypropylene (PP). The table main body 10 is formed with two cup holders 11 at a front half area thereof, into which a beverage container can be inserted and set from above, and is formed with a rectangular recessed accommodation space 12 at a rear half area thereof.

Figure 3:
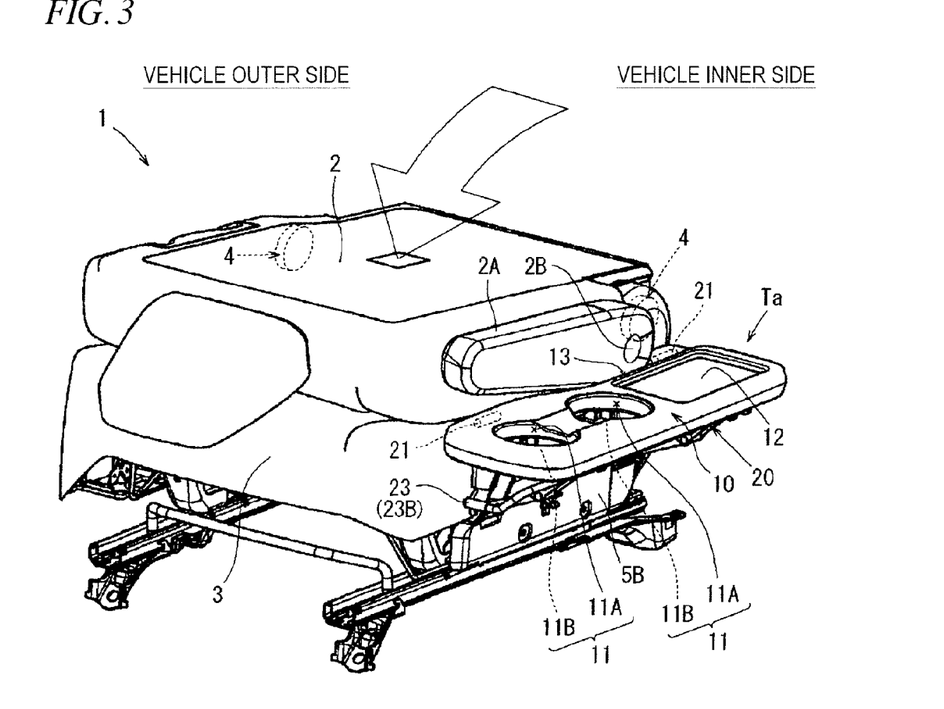
FIG. 3 is a perspective view showing a state where a seat back is folded down at an extended state of the table.
Figure 4:
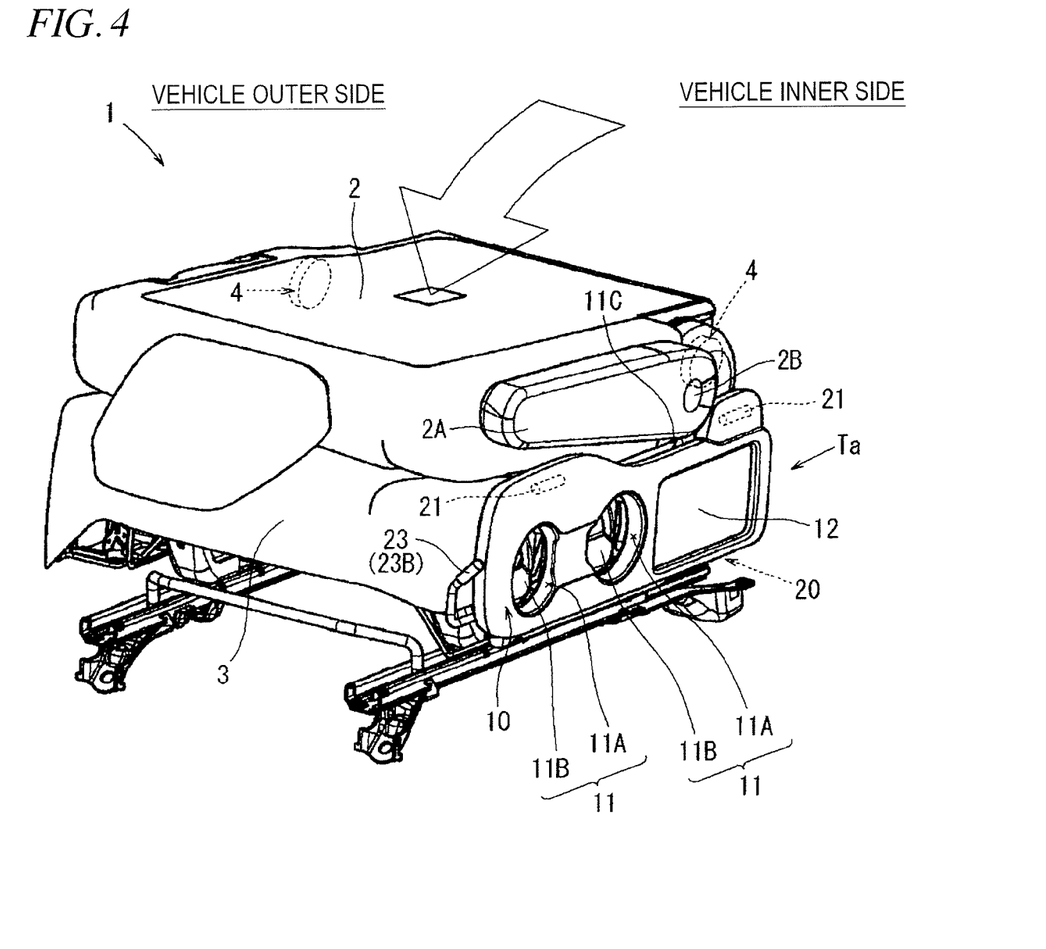
FIG. 4 is a perspective view showing a state where the seat back is folded down at a retracted state of the table.

Also, the table main body 10 is formed at its inner side adjacent to the seat 1 with a concave portion 13 for avoiding an interference with the armrest 2A attached to the side of the seat back 2 when the seat back 2 of the seat 1 is folded forwards (refer to FIGS. 3 and 4). The concave portion 13 is formed to penetrate in a plate thickness direction so as to avoid the interference with the armrest 2A not only at the state where the table main body 10 is horizontally extended (refer to FIG. 3) and but also at the state where the table main body 10 is vertically retracted (refer to FIG. 4).

Figure 10:
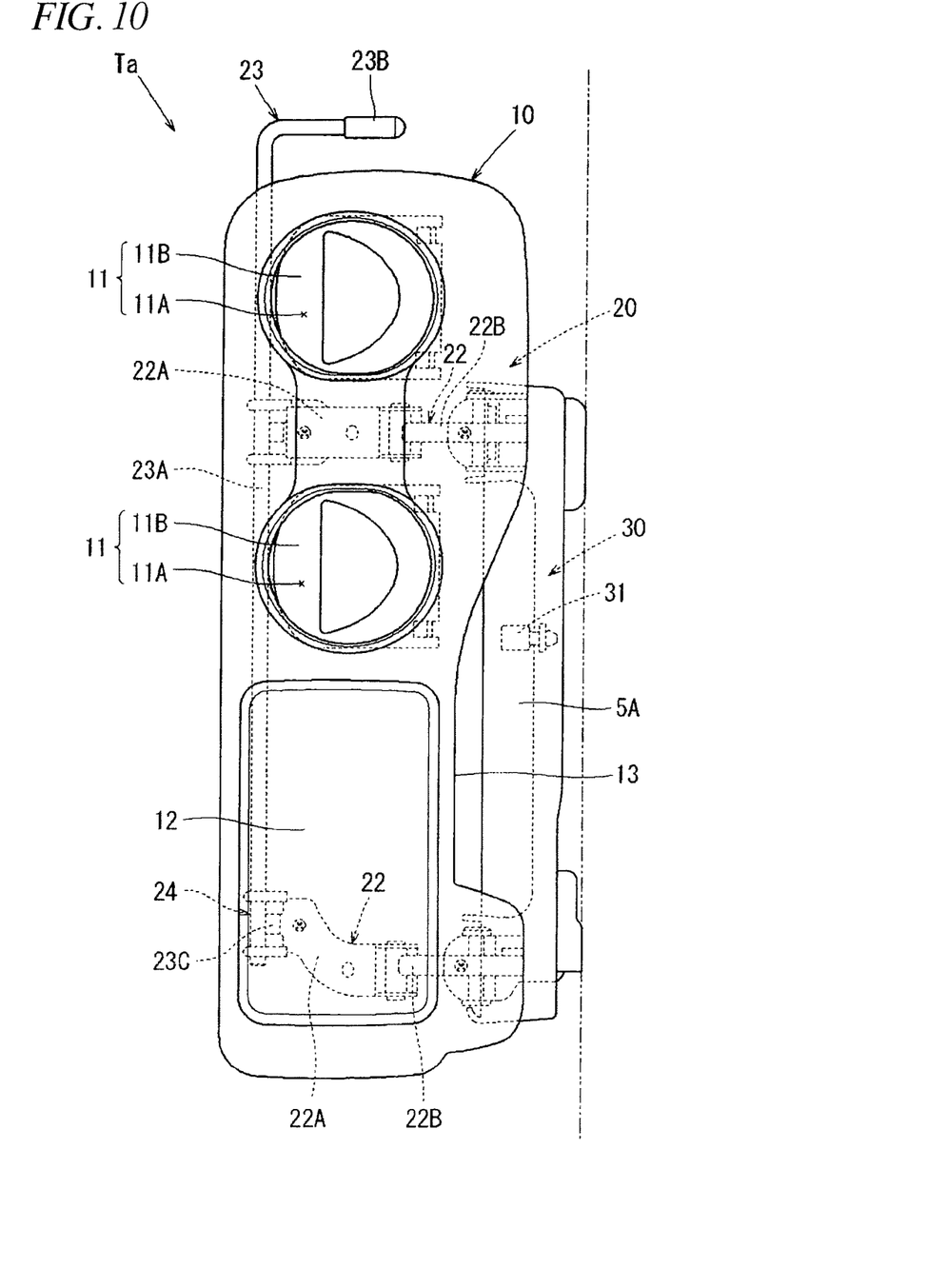
FIG. 10 is a plan view of the table.
Figure 11:
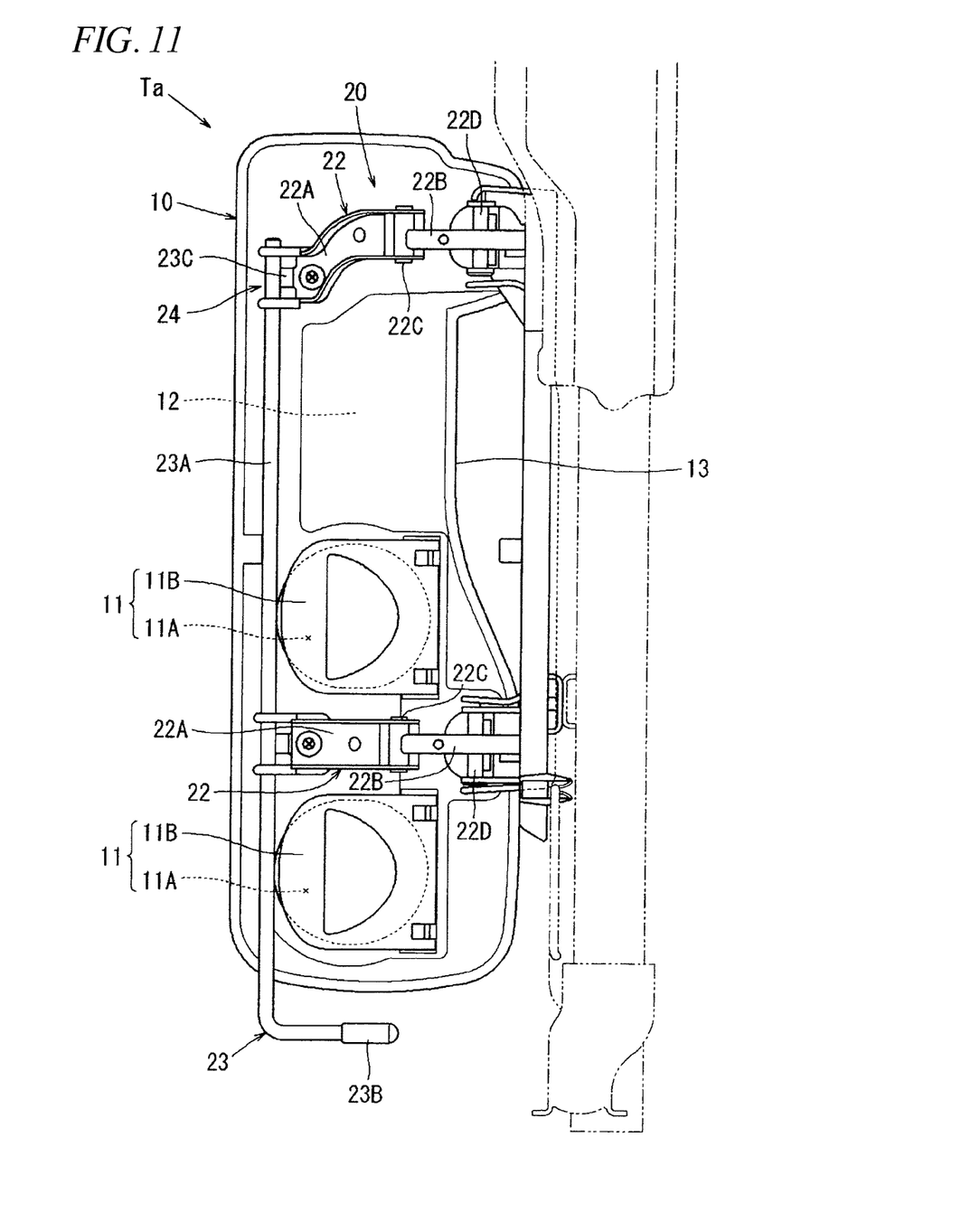
FIG. 11 is a bottom view of the table.

As shown in FIGS. 10 and 11, the two cup holders 11 formed at the table main body 10 have a round hole 11A, a support member 11B rotatably supported to the bottom part of the table main body 10 by a hinge, and a spring (not shown) configured to urge the support member 11 B in a direction of folding the support member 11B towards the bottom part of the table main body 10, respectively. Each cup holder 11 is configured such that the support member 11B is all the time folded and held in the bottom part of the table main body 10 by the urging force. Each cup holder 11 is configured such that when the beverage container is inserted into the round hole 11A of the table main body 10 from above, the support member 11B is press-rotated downwardly by a predetermined angle to support the beverage container from below.

Figure 5:
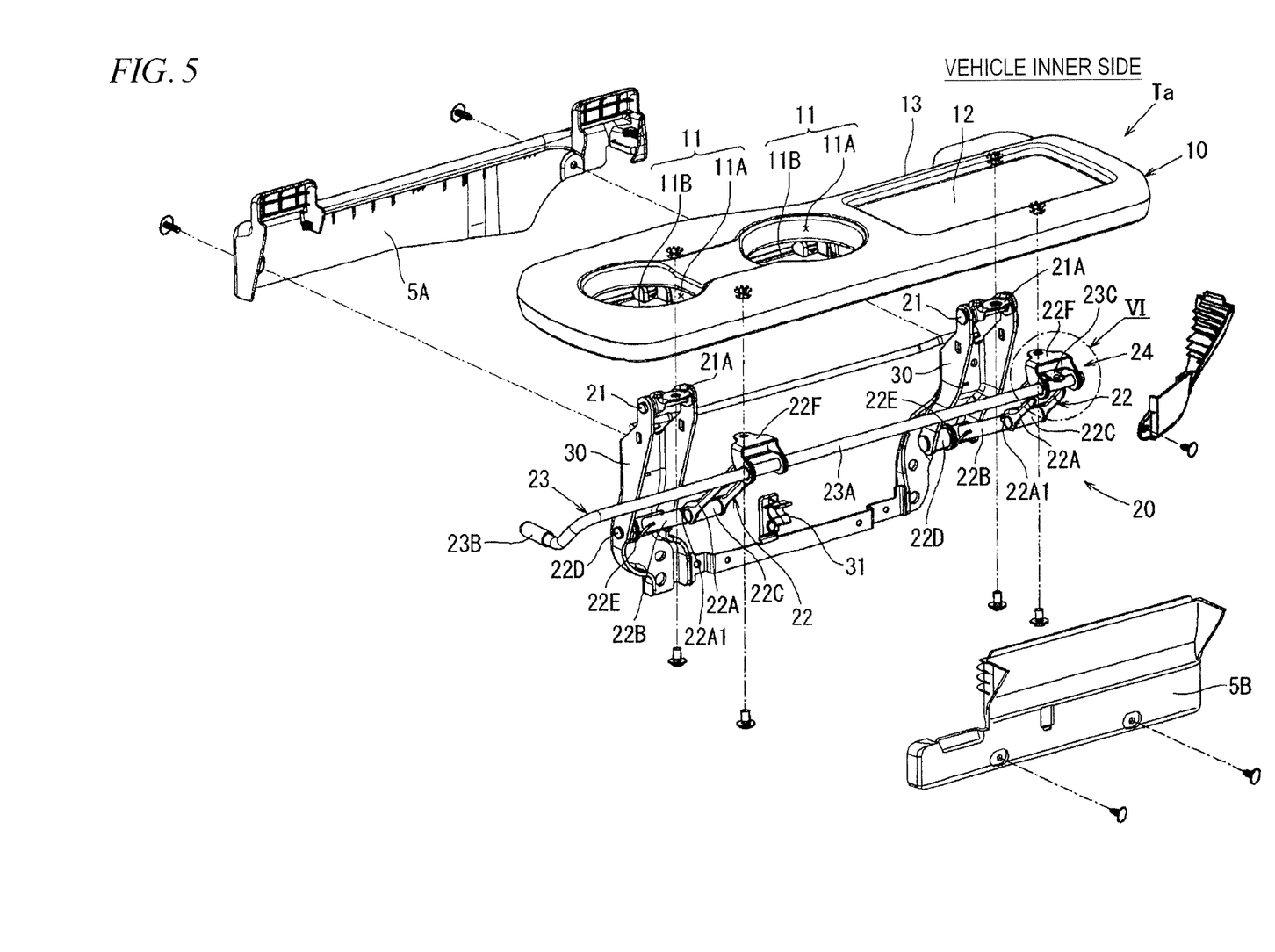
FIG. 5 is an exploded perspective view of the table.

Subsequently, the extending and retracting mechanism 20 configured to extend and retract the table main body 10 is described. As shown in FIG. 5, the extending and retracting mechanism 20 has a pair of front and rear connecting shafts 21 configured to tiltably connect the table main body 10 to bases 30 fixed to the side of the seat cushion 3 of the seat 1, a pair of front and rear link mechanism units 22 connected between the table main body 10 and the bases 30 and configured to extend and retract the table main body 10, an operation part 23 connected to the respective link mechanism units 22 and configured to enable the link mechanism units 22 to perform the extending and retracting operations, and a cancel mechanism unit 24 configured to prevent the respective link mechanism units 22 from performing the retracting operation without through the operation of the operation part 23.

The bases 30 have a pair of front and rear steel plate materials having a vertically long shape and fixed to a side frame of the vehicle inner side of the seat cushion 3. Each of the pair of front and rear steel plate materials having a vertically long shape and configuring the base 30 has high structural strength against the bending and the distortion because front and rear edge portions thereof are bent in an outward direction of the seat. The bases 30 are mounted with a planar inner shield 5A made of resin from an inner side of the seat and a planar outer shield 5B made of resin from an outer side of the seat such that the shields are bridged between the pair of front and rear steel plate materials. Thereby, the bases 30 are covered from the inner side and the outer side over a wide range such that a gap between the pair of front and rear steel plate materials is not exposed to the outside.

Also, the pair of front and rear connecting shafts 21 are respectively arranged such that an axial direction thereof coincides with the longitudinal direction of the seat, and is configured to connect brackets 21A, which are respectively coupled to a front-inner side bottom part and a rear-inner side bottom part of the table main body 10, to upper end portions of the respective steel plate materials of the bases 30 so as to be rotatable. The respective brackets 21A are integrally fixed to the front-inner side bottom part and rear-inner side bottom part of the table main body 10 by bolt fastening. By the connection, the table main body 10 can be tilted relative to the bases 30 about the respective connecting shafts 21 between the horizontally extended state (refer to FIG. 3) and the vertically retracted state (refer to FIG. 4).

As shown in FIG. 5, each of the pair of front and rear link mechanism units 22 has a first link 22A and a second link 22B linked to bend and extend each other between the table main body 10 and the base 30. The respective first links 22A are axis-rotatably connected to brackets 22F, which are coupled to a front-outer side bottom part and a rear-outer side bottom part of the table main body 10, by one connecting shaft 23A having a long shape in the longitudinal direction and inserted into one end portions (upper end portions in FIG. 5) of the first links 22A in the longitudinal direction. The respective brackets 22F are integrally fixed to the front-outer side bottom part and rear-outer side bottom part of the table main body 10 by bolt fastening. By the connection, the respective first links 22A are connected to the bottom part of the table main body 10 such that the first links can rotate about the connecting shaft 23A.

Specifically, each of steel plate materials having a long shape in the vertical direction is bent to have a U-shaped or reverse U-shaped cross section, each U-shaped bent upright wall part and each revere U-shaped bent upright wall part are arranged to overlap with each other and the connecting shaft 23A is inserted therein, so that the first link 22A and the bracket 22F are assembled to relatively rotate. The connecting shaft 23A having a long shape is integrally connected to the front first link 22A as the respective inserted places thereof are strongly connected to the front first link 22A by welding, and is simply inserted into the front bracket 22F and is thus rotatably connected to the front bracket 22F. On the other hand, the connecting shaft 23A is simply inserted into the rear first link 22A and the rear bracket 22F and is thus rotatably connected thereto.

Figure 6:
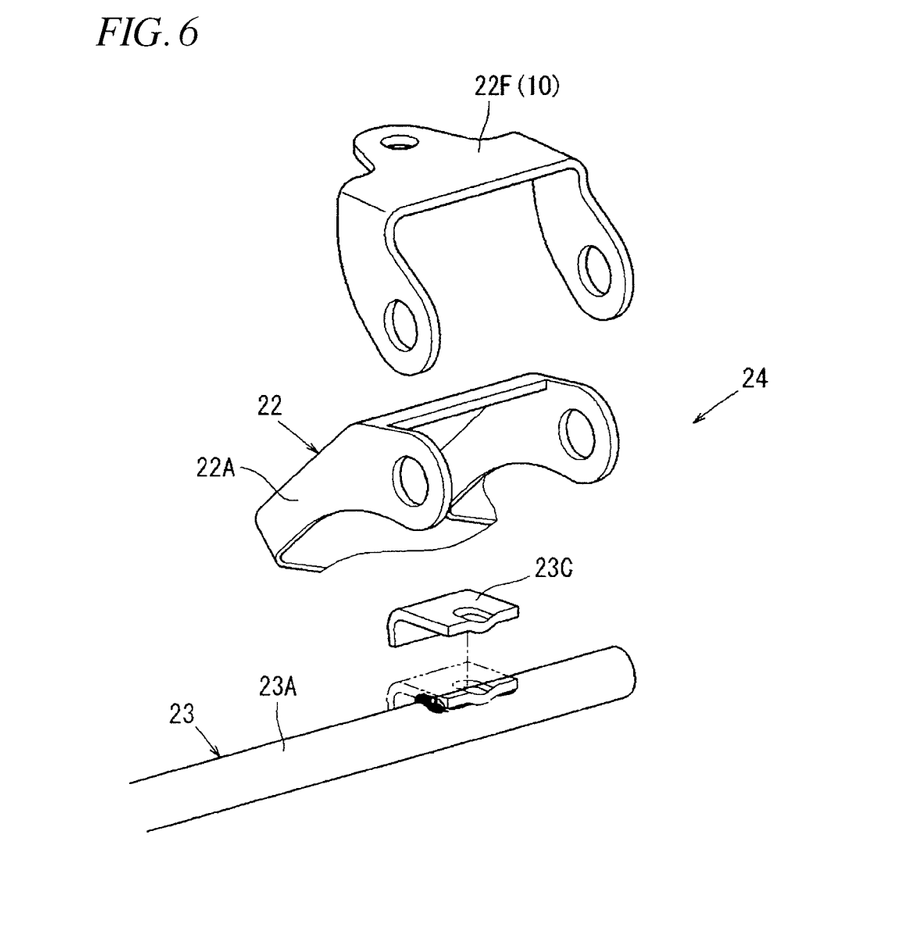
FIG. 6 is an enlarged view of VI part of FIG. 5.
Figure 7:
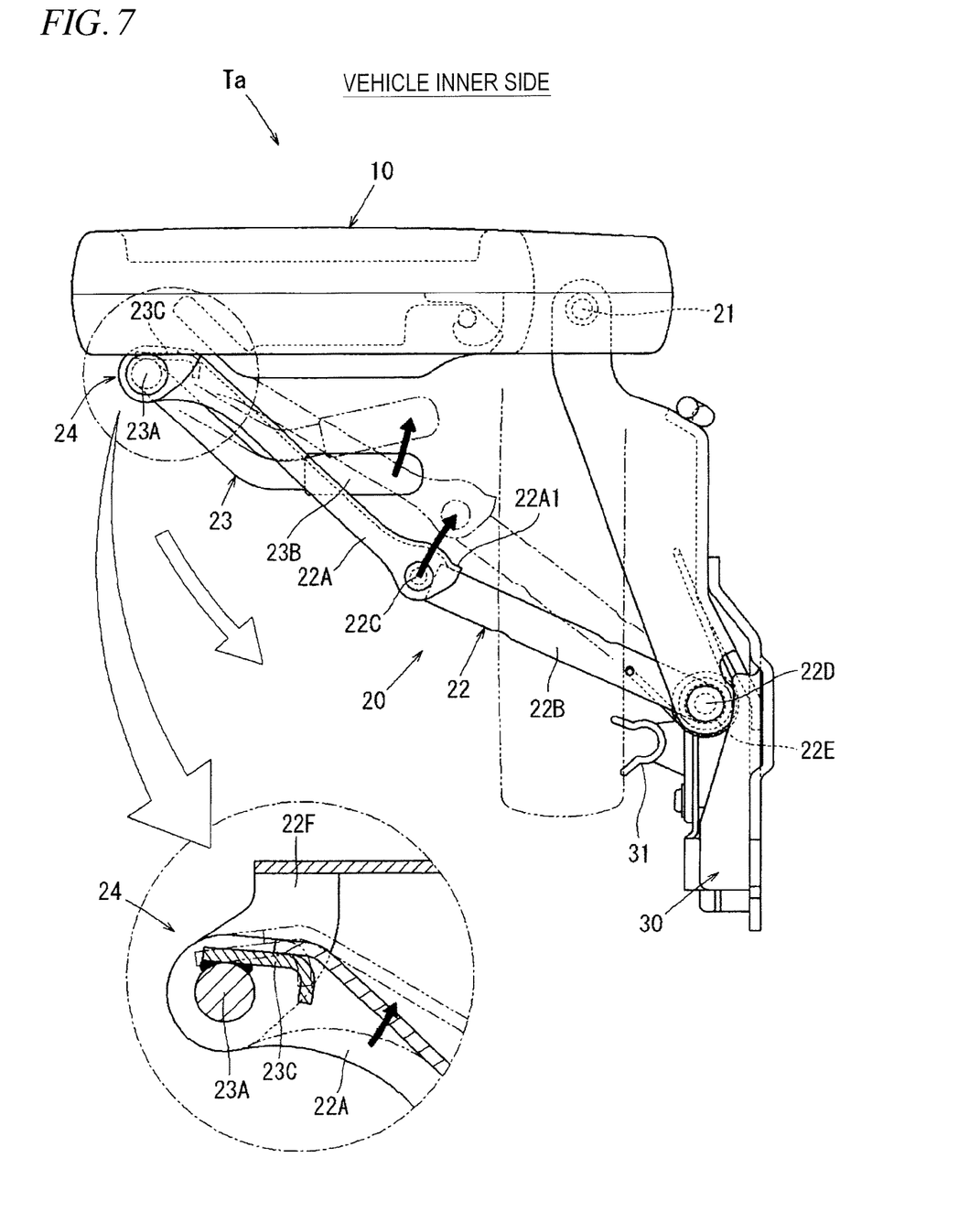
FIG. 7 is a rear view of the table in an extended state.
Figure 9:
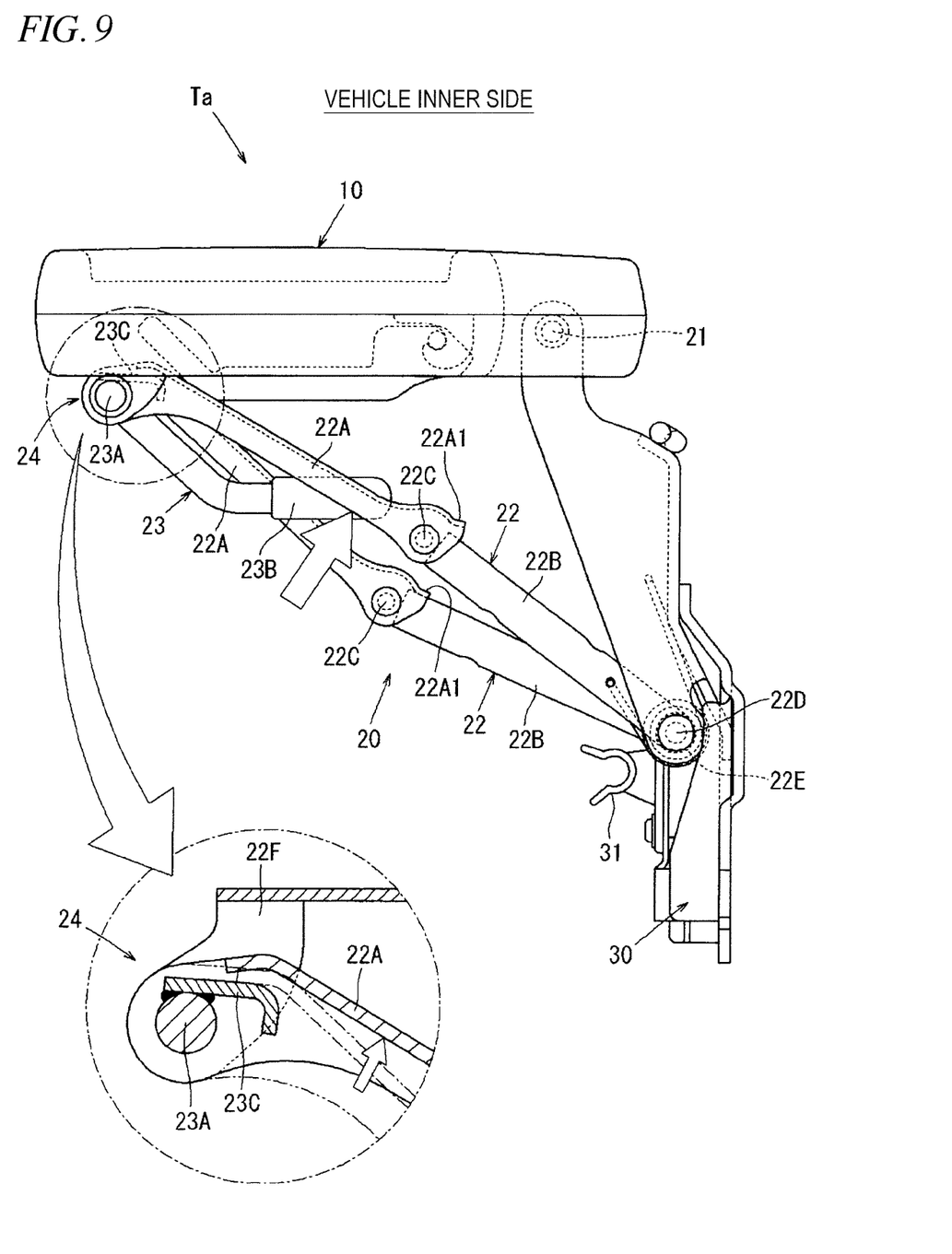
FIG. 9 is a rear view showing a state where a rear bending and extending link is bent by an external force.

As shown in FIG. 6, the connecting shaft 23A is coupled integrally with a force transmission piece 23C extending in a radial direction of rotation at a place where the connecting shaft is inserted into the U-shaped upright wall parts of the rear first link 22A. As shown in FIG. 7, the force transmission piece 23C is configured to contact a wall part connecting the U-shaped upright wall parts of the rear first link 22A and to press-rotate the rear first link 22A in a shown counterclockwise direction when the connecting shaft 23A is rotated in the counterclockwise direction (a direction along which the first link 22A is retraction-operated) relative to the rear first link 22A. However, as shown in FIG. 9, when the rear first link 22A is directly rotated in the shown counterclockwise direction (retracting direction) relative to the connecting shaft 23A by any externally applied force, not by the connecting shaft 23A rotating as described above, the wall part of the first rear link 22A is rotated in a direction separating from the force transmission piece 23C. At this time, even when the rear first link 22A is rotated, the force transmission piece 23C does not transmit the force to the connecting shaft 23A (i.e., the first rear link 22A idles).

As shown in FIG. 5, each second link 22B has a configuration in which one end portion (an upper end portion in FIG. 5) thereof is axis-rotatably connected to the other end portion (a lower end portion) of the first link 22A by a connecting shaft 22C and the other end portion (a lower end portion in FIG. 5) is axis-rotatably connected to the lower part of the steel plate material of the base 30 by a connecting shaft 22D. The respective connecting shafts 22C, 22D are arranged such that the axial directions thereof coincide with the longitudinal direction of the seat, like the connecting shaft 23A having a long shape. By the connection, each second link 22B can be rotated relative to the bases 30 about the connecting shaft 22D and can be rotated relative to the first link 22A about the connecting shaft 22C. Also, a connection part of the second link 22B and the base 30 by the connecting shaft 22D is mounted with a torsion spring 22E configured to always urge the second link 22B in the extending direction (the counterclockwise direction in FIG. 7) relative to the base 30.

Figure 8:
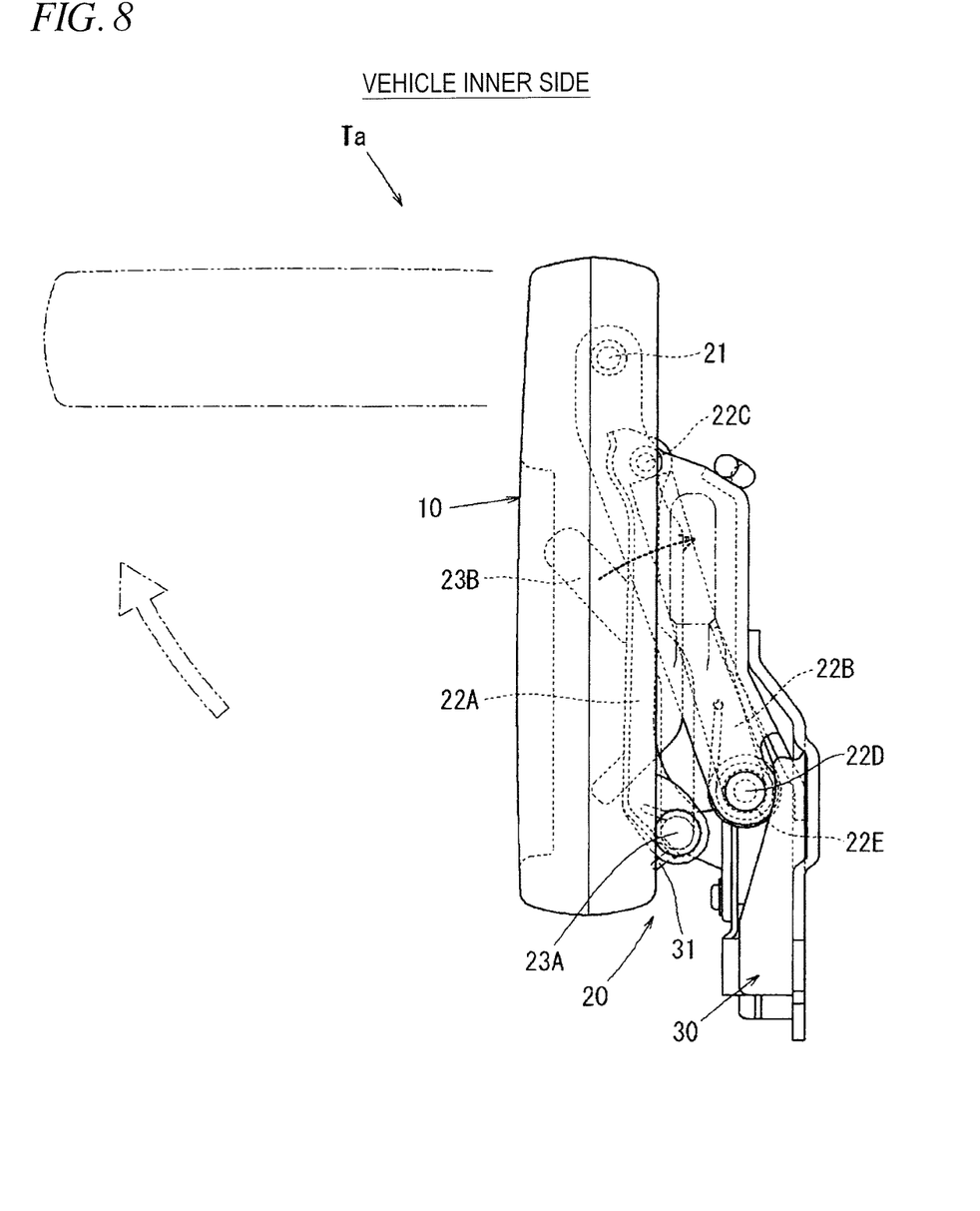
FIG. 8 is a rear view of the table in a retracted state.

As shown in FIGS. 7 and 8, the pair of front and rear link mechanism units 22 are configured to move the first links 22A and the second links 22B to bend and extend between the table main body 10 and the bases 30, thereby extending the table main body 10 in the horizontal posture (refer to FIG. 7) or retracting the table main body 10 in the vertically hanging posture (refer to FIG. 8). Specifically, as shown in FIG. 7, each link mechanism unit 22 is configured such that the second link 22B is always press-rotated in the shown counterclockwise direction about the connecting shaft 22D with the base 30 by an urging force of the torsion spring 22E and the first link 22A is applied with the corresponding movement and is thus applied with the force enabling the first link 22A to rotate in the shown clockwise direction about the connecting shaft 23A with the table main body 10 from the connecting shaft 22C with the second link 22B. By the extending rotation due to the urging force, each link mechanism unit 22 is configured to raise the table main body 10 up to the horizontal posture about the connecting shaft 21 with the base 30 while widening an angle between the first link 22A and the second link 22B.

As shown in FIG. 7, each link mechanism unit 22 is configured to stop the extending rotation as each engaging claw 22A1 extending from an end portion of the first link 22A connected to the second link 22B is brought into contact with the second link 22B. Specifically, the engaging claw 22A1 is configured such that when the first link 22A and the second link 22B are rotated to a rotating position at which the angle therebetween is larger than 180°, the engaging claw is contacted to the second link 22B to stop the rotation. By this configuration, each link mechanism unit 22 can keep the table main body 10 at the horizontal posture at the state where the first link 22A and the second link 22B are supported with being relatively straightly extended between the table main body 10 and the base 30. Accordingly, even when a load (a load applied in a gravity direction) is applied to each link mechanism unit 22 from the table main body 10, since the load acts as a force applied in a direction of further extending the first link 22A and the second link 22B, each link mechanism unit 22 is stably kept at the extended state.

Also, when the connecting shaft 23A is rotated in the shown counterclockwise direction against the urging force of the torsion spring 22E by a rotating operation of a handle part 23B (which will be described later), each link mechanism unit 22 is bent and folded while narrowing the angle between the first link 22A and the second link 22B (refer to FIG. 8). Specifically, each link mechanism unit 22 is configured such that when the connecting shaft 23A is rotated, the first link 22A is press-rotated in the same direction integrally with the connecting shaft 23A, and the second link 22B is applied with the corresponding movement through the connecting shaft 23C and is thus press-rotated in the shown clockwise direction about the connecting shaft 22D with the base 30. By the rotation, as shown in FIG. 8, while narrowing the angle between the first link 22A and the second link 22B, each link mechanism unit 22 is folded as if it pulls the table main body 10 closer to the base 30. Also, each link mechanism unit 22 is configured such that the connecting shaft 23A is pressed and sandwiched into a gripping member 31 fixed to the base 30 by the retracting rotation and is held not to be extended at the retracted state by the urging force of the torsion spring 22E.

As shown in FIG. 5, the operation part 23 has the connecting shaft 23A inserted and assembled into the upper end portions of the pair of front and rear first links 22A, the handle part 23B formed by bending a tip portion (a front end portion) of the connecting shaft 23A, and the force transmission piece 23C coupled to a part of the connecting shaft 23A. As shown in FIG. 7, the operation part 23 is configured to rotate the connecting shaft 23A in the shown counterclockwise direction and to move (retracting rotate) each link mechanism unit 22 in the direction of retracting the table main body 10, as a user grips and rotates upwardly the handle part 23B from the extended state of the table main body 10. The retracting rotation of each link mechanism unit 22 is performed by the rotation operation of the handle part 23B and causes the connecting shaft 23A to be pushed into the gripping member 31 of the base 30 by the force applied to the handle part 23B (refer to FIG. 8).

Also, as shown in FIG. 8, the operation part 23 is configured to rotate the connecting shaft 23A in the shown clockwise direction, to move (extending rotate) each link mechanism unit 22 in the direction of extending the table main body 10 and to pull out the connecting shaft 23A from the gripping member 31 of the base 30, as the user grips and rotates downwardly the handle part 23B. As the connecting shaft 23A is pulled out from the gripping member 31 of the base 30, each link mechanism unit 22 is rotated in the extending direction in connection with the rotation operation of the handle part 23B with being applied with the assist force due to the urging of the torsion spring 22E and is extended up to the position of FIG. 7 at which the rotation stops. At this time, the rear link mechanism unit 22 is configured such that the rear first link 22A and the connecting shaft 23A do not follow the rotation in the extending direction. However, by the urging force of the torsion spring 22E, the rear link mechanism unit 22 is extended up to the same position as the front link mechanism unit 22, at which the rotation stops.

As shown in FIG. 9, even when the rear link mechanism unit 22 is contacted with a foot of a passenger sitting on a rear seat and thus bent, the operation part 23 relieves the corresponding movement of the rear link mechanism unit 22 so as not to apply an influence to the front link mechanism unit 22 since the connecting shaft 23A does not follow the movement of the rear first link 22A with respect to the corresponding movement. Therefore, even when the above-described external force is applied to the rear link mechanism unit 22, the table main body 10 is not retracted and is stably kept at the extended position. Also, when the external force resulting from the contact with the foot is removed, the rear link mechanism unit 22 returns to the original extended position by the urging force of the torsion spring 22E. By this configuration, the cancel mechanism unit 24 for preventing the respective link mechanism units 22 from performing the retracting operation without through the operation of the operation part 23 is configured.

As described above, the table Ta of this illustrative embodiment includes the table main body 10 on which an object can be put, and the extending and retracting mechanism 20 configured to connect the table main body 10 to the bases 30 such that the table main body 10 can be extended and retracted relative to the bases. The extending and retracting mechanism 20 has the respective link mechanism units 22 configured to extend and retract the table main body 10 relative to the bases 30 by the link movement, the operation part 23 connected to the respective link mechanism units 22 and configured to operate the respective link mechanism units 22, and the cancel mechanism unit 24 configured to prevent the respective link mechanism units 22 from being operated without through the operation of the operation part 23. The respective link mechanism units 22 are configured in a pair to extend and retract the table main body 10 relative to the bases 30. The cancel mechanism unit 24 is configure such that, while the operation part 23 is connected to the front link mechanism unit 22 such that the force can be transmitted in both the extending direction and the retracting direction and is connected to the rear link mechanism 22 such that the force can be transmitted only in one direction of the extending direction and the retracting direction and cannot be transmitted in the other direction of the extending direction and the retracting direction, even when the rear link mechanism unit 22 is operated in the other direction (retracting direction) without through the operation of the operation part 23, this operating force is not transmitted to the operation part 23.

By the above configuration, even when the rear link mechanism unit 22 is operated in the other direction (retracting direction) without through the operation of the operation part 23, the operating force is not transmitted to the operation part 23. Therefore, even when the above-described external force is applied, since it is possible to keep the front link mechanism unit 22 at the extended posture, it is possible to prevent the table main body 10 from being unintentionally retracted due to the external force.

Further, the extending and retracting mechanism 20 is configured to extend and retract the table main body 10 relative to the bases 30 between the horizontally extended state and the vertically retracted state by a rotation. The link mechanism units 22 are configured to be extended and bent between the table main body 10 and the base 30 such that the link mechanism units 22 are extended to hold the table main body 22 at the extended state and are bent to guide the table main body 22 in a retracting direction. The cancel mechanism unit 24 is configured such that a force applied from the operation part 23 in a direction from an extended sate to a bent state of the rear link mechanism unit 22 is transmitted and a force in an opposite direction is not transmitted.

By the above configuration, even when the rear link mechanism unit 22 is contacted with the passenger's foot, for example, and is thus applied with the external force in the direction of bending the rear link mechanism unit 22 in the configuration where the table main body 10 is held at the extended state by the support of the link mechanism units 22, the front link mechanism unit is still held at the support posture state. Therefore, even when the above-described foldable table is mounted at a low position at which the passenger's foot can be contacted thereto, it is possible to prevent the table main body 10 from being unintentionally retracted.

Also, the cancel mechanism unit 24 is configured by a contact structure (a structure in which the force transmission piece 23C attached to the connecting shaft 23A is contacted or not contacted to the rear link mechanism unit 22) provided between the operation part 23 and the rear link mechanism unit 22 such that the operation part 23 contacts the rear link mechanism unit 22 to become a state of capable of transmitting a force in the one direction, and the operation part 23 is separated from the rear link mechanism unit 22 to become a state of not transmitting a force in the other direction. By this configuration, it is possible to simply configure the cancel mechanism unit 24 by the simple contact structure.

While the present invention has been shown and described with reference to certain illustrative embodiments thereof, it will be understood by those skilled in the art that various changes in form and details may be made therein without departing from the spirit and scope of the invention as defined by the appended claims. For example, the table of the present invention may be provided for any vehicle, in addition to the automobile. Also, the table may be attached to any member, rather than a seat of a vehicle main body and the like. Also, the table is not limited to the configuration where the table extends towards the side of the seat, and may be configured to extend towards the rear of the seat so as to provide the table for a passenger sitting on a rear seat or to extend towards the front of the seat.

Also, the extending and retracting mechanism may be configured to extend and retract the table main body by a sliding movement. Also, the extending and retracting mechanism may be configured to retract the table main body by raising or swinging the table main body from the horizontal posture. Also, the one-way contact structure configuring the cancel mechanism unit may be provided for any of the operation part and the other of the link mechanism units and may be provided for both of them. Also, the cancel mechanism unit may be configured to prevent each link mechanism unit from being extended without through the operation of the operation part.

What is claimed is:

1. A table for a vehicle comprising:
a table main body, on which an object can be put; and
an extending and retracting mechanism configured to connect the table main body to a base such that the table main body can be extended and retracted relative to the base,
wherein the extending and retracting mechanism includes:
a pair of link mechanism units configured to extend and retract the table main body relative to the base by a link movement;
an operation part connected to the link mechanism units and configured to operate the link mechanism units; and
a cancel mechanism unit configured to prevent the link mechanism units from being operated without through an operation of the operation part, and
wherein the cancel mechanism unit is configured such that, while the operation part is connected to one of the link mechanism units such that a force can be transmitted in both an extending direction and a retracting direction and is connected to the other of the link mechanism units such that a force can be transmitted only in one direction of the extending direction and the retracting direction and cannot be transmitted in the other direction of the extending direction and the retracting direction, when the other of the link mechanism units is operated in the other direction without through the operation of the operation part, an operating force is not transmitted to the operation part.

2. The table according to claim 1,
wherein the extending and retracting mechanism is configured to extend and retract the table main body relative to the base between a horizontally extended state and a vertically retracted state by a rotation,
wherein the link mechanism units are configured to be extended and bent between the table main body and the base such that the link mechanism units are extended to hold the table main body at the extended state and are bent to guide the table main body in a retracting direction, and
wherein the cancel mechanism unit is configured such that a force applied from the operation part in a direction from an extended state to a bent state of the other of the like mechanism units is transmitted and a force in an opposite direction is not transmitted.

3. The table according to claim 2, further comprising:
an urging member configured to urge the link mechanism units towards the extended state.

4. The table according to claim 1,
wherein the cancel mechanism unit is configured by a contact structure provided between the operation part and the other of the link mechanism units such that the operation part contacts the other of the link mechanism units to become a state capable of transmitting a force in the one direction, and the operation part is separated from the other of the link mechanism units to become a state of not transmitting a force in the other direction.

5. The table according to claim 4,
wherein the operation part includes a connecting shaft which is fixed to the one of the link mechanism units and is rotatably connected to the other of the link mechanism units, and
wherein the connecting shaft is provided with a force transmission piece extending in a radial direction of the connecting shaft, and the force transmission piece is configured to contact the other of the link mechanism units when the operation part is rotated in the one direction and configured to be separated from the other of the link mechanism units when the operation part is rotated in the other direction.

* * * * *